May 25, 1937. A. M. LENDRUM ET AL 2,081,751
CORN POPPER
Filed Oct. 26, 1935

INVENTORS
Alexander M. Lendrum
John N. Orebaugh
BY O. Z. McCoy
ATTORNEY

Patented May 25, 1937

2,081,751

UNITED STATES PATENT OFFICE 2,081,751

CORN POPPER

Alexander M. Lendrum and John N. Orebaugh, Norwalk, Ohio

Application October 26, 1935, Serial No. 46,838

21 Claims. (Cl. 53—4)

This invention relates to cooking utensils and more particularly to a cooking device that is adapted for use in popping corn.

In the past cooking utensils used for popping corn have required substantially constant attention and care in their operation and in many forms of device the corn grains are destroyed for popping by the presence of surface zones of unevenly distributed and excessively high temperatures.

The present invention provides a corn popper wherein the element of constant personal attention is minimized and wherein the corn grains are subjected to a substantially uniformly distributed surface heat treatment by the intervention of a heat distributing and equalizing reservoir between the source of the heat energy and the grain to be popped.

An object of the present invention is to provide a cooking utensil that is primarily adapted for the cooking of popcorn wherein the unit grains are subjected to a substantially uniform temperature gradient thruout their surface portions.

Another object is to provide a cooking utensil wherein the transfer of heat energy from its source to the object to be cooked is thru an intermediate heat distributing and equalizing reservoir of substantially freely circulating fluid.

Another object is to provide a corn popper that produces an improved product without agitation by the operator.

Another object is to provide a corn popper that produces popcorn with a minimum of burned grains and that is buttered to a controlled degree.

With the above and other objects in view, which will be apparent from the following detailed description, the present invention may be said to consist in certain features of construction and combinations of parts which will be understood readily by those skilled in the art to which the invention appertains.

In the drawing, which illustrates suitable embodiments of the invention:

Figures 1, 2:
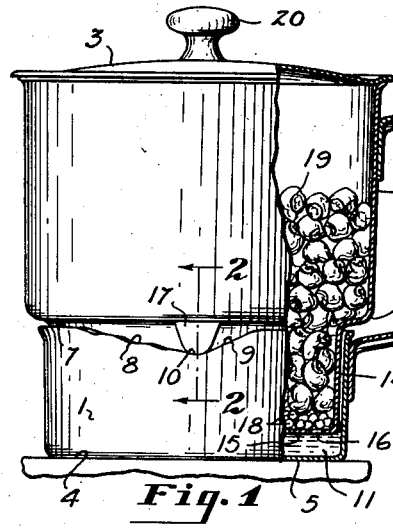
Fig. 1 is an elevational view, partly broken away, of the preferred form of corn popper in assembled condition.
Fig. 2 is a section taken along the line 2—2 of Fig. 1.
Figure 4:
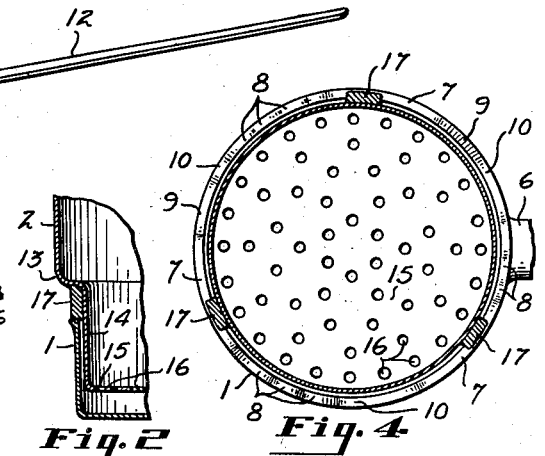
Fig. 4 is a section taken along the line 4—4 of Fig. 3.
Figure 3:
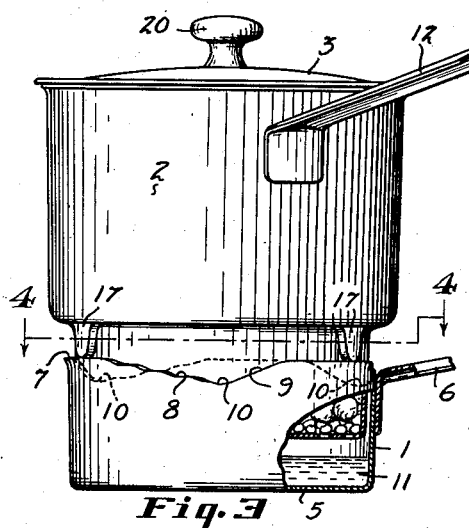
Fig. 3 is an elevation, partly broken away, of the grain container in draining position supported on the oil container.

The corn popper that is illustrative of the cooking utensil that forms the subject matter of the present invention, comprises an oil container 1, a grain container 2, and a cover 3, all of which are supported on the heating surface 4. The grain container 2 is supported on the upper rim of the oil container 1 at two or more levels, one for a cooking operation and one for an oil draining operation.

The oil container 1 terminates downwardly in the closed bottom portion 5 and is provided with suitable handling means, such as the handle 6 that is preferably welded thereto.

The side wall of the oil container 1 terminates upwardly in a rim that preferably comprises a plurality of cam engaging substantially flat land portions 7, that serve during the grain container drainage operation, and that are interrupted by a plurality of cam engaging depressed portions that serve during the grain cooking operation. The depressed portions preferably have inclined lateral surfaces, the inclination of which may be interrupted, if desired, by a plurality of steps or depressions 8, or may be of a substantially continuously uniform inclination, such as the inclined cam engaging face 9. The cam engaging inclined surfaces terminate downwardly in the cam engaging lowermost portion 10.

A supply of oil 11 is positioned within the oil container 1 to form a heat accumulating and distributing reservoir therein.

The grain container 2 is provided with the handle 12 that is preferably welded thereto. The grain container is continuous thru the shoulder portion 13 with the lower portion 14 that is of suitable diameter to pass freely within the oil container 1 with sufficient clearance therebetween so that objectionable rising of the oil from the interior of the oil receptacle by capillary action will be avoided.

The grain container bottom portion 15 is provided with a plurality of apertures 16 that are smaller than the grains that are to be supported by the bottom portion 15 and that are sufficiently numerous to provide for the substantially free circulation of oil therethru.

In the preferred form of the device a plurality of cam blocks 17, that engage the upper surface of the oil container rim, are preferably welded to the corn container lower portion 14 in abutting relation with the shoulder portion 13. The cam blocks 17 are of sufficient thickness to engage any portion of the upper rim of the oil container and are sufficiently numerous to impart stability to the grain container when supported by the oil container.

In the preferred form of the device, the engagement so provided affords a controllable adjustment of the space that separates the perforated grain container bottom portion 15 from the oil container bottom 5, thereby providing a nice adjustment of the depth beneath the surface level of the oil in the oil container at which the grain container apertured bottom 15 may be submerged.

The depth of the oil in the oil container is preferably maintained at a minimum because of the increasing rancid quality of successively heated oil. The quantity of oil should be sufficient, however, so that the unpopped grains 18 that are to be heated, are subjected thruout their surfaces to a substantially uniform degree of heat whether they are completely immersed in oil or not. The oil level should also be suitably positioned so that when the tips of the cam blocks 17 are on the upper flat lands 7 of the oil container rim the apertured grain container bottom portion is positioned above the surface level of the oil in the oil container, for purposes of drainage.

The grain container cover 3 serves to prevent the escape of the popped corn 19 and drops of splattered oil during the popping operation. A suitable handle 20 is mounted on the cover 3.

Figures 5, 6, 7:
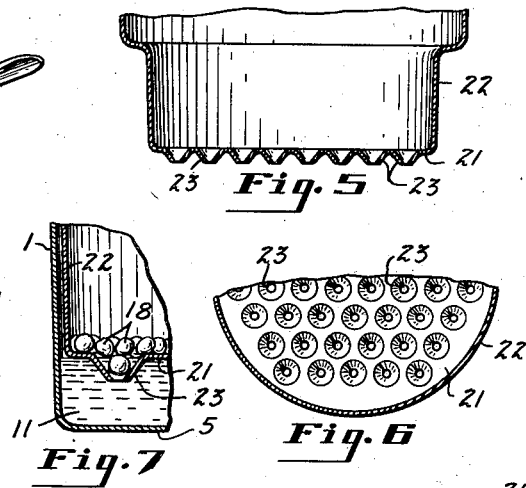
Fig. 5 is a section of a modified form of apertured grain container bottom portion.
Fig. 6 is a fragmentary plan view of the grain container bottom portion that is shown in Fig. 5.
Fig. 7 is an enlarged fragmentary section of the grain container bottom portion that is shown in Figs. 5 and 6, in assembled relation with the oil container.

The drainage means that forms the grid bottom of the grain container may be modified in various ways, one of which is shown in Figs. 5–7, inclusive, of the drawing. In this construction the grain container bottom portion 21, that forms a part of the grain container 22, is provided with a plurality of downwardly opening frustro-conical structures 23 that are each preferably of sufficient diameter to admit one or more grains 18 therein. The oil level is preferably maintained substantially flush with the upper rim of the structures 21 by the quantity of oil that is placed in the oil container with or without the use of adjusting means between the grain container and the oil container.

Figure 8:
Fig. 8 is a section of a second modification in the grain container bottom portion.
Figure 9:
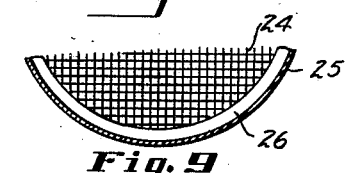
Fig. 9 is a fragmentary plan view of the grain container bottom portion that is shown in Fig. 8.

Further modification in the drainage bottom portion of the grain container is shown in Figs. 8 and 9 of the drawing, wherein a screen 24 forms the bottom of the grain container 25. The screen 24 is preferably secured to the container 25 or it may be loosely positioned therein for facilitating the cleaning of the screen and container. In the form of screen that is shown the screen 24 is welded along its periphery to the ring 26 that provides a sturdy peripheral edge for the screen 24 and that rests on or is welded to the inturned flange 27 that is integral with the lower portion of the grain container 25.

Figure 10:
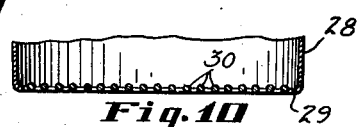
Fig. 10 is a section of a third modification in grain container bottom portion.
Figures 11, 12:
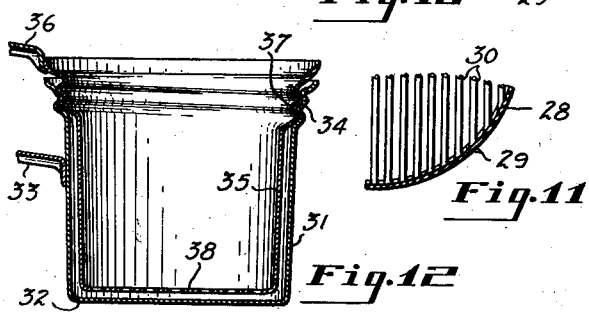
Fig. 11 is a fragmentary plan view of the grain container bottom portion that is shown in Fig. 10.
Fig. 12 is an elevational section of the first modification in the adjusting means that is interposed between the oil container and the grain container.

Another modification in the drainage bottom portion of the grain container is shown in Figs. 10 and 11 of the drawing. In this construction the grain container 28 terminates downwardly in the inwardly extending flange 29 to which the opposite ends of each of a plurality of spaced rods 30 are preferably permanently welded. The rods 30 preferably extend in a direction that is substantially parallel with or that is normal to the direction in which the handle of the grain container extends in order to facilitate the clean drainage of oil from the rods 30 in a direction that is longitudinal thereof.

A modification in the means for varying the position of any of the disclosed forms of grain container grid bottom with respect to the oil container bottom is shown in Fig. 12. In this construction the oil container 31, with closed bottom portion 32, is provided with a handle 33 and threads 34 are positioned adjacent its upper peripheral rim. The grain container 35 is provided with the handle 36, the threads 37 that engage the oil container threads 34 and the grain container 35 terminates downwardly in any of the described forms of grid bottom 38.

In operation, the oil container is first charged with a suitable quantity of oil. The grain container is then positioned within the oil container and suitable adjustment is made, either by variations in the quantity of oil with which the oil container is charged or by the adjustment of the means that is interposed between the oil container and the grain container so that the drainage grid bottom of the grain container is submerged in the oil to a depth that corresponds roughly to the thickness of one or more grains that are to be positioned within the grain container.

A few grains of popping corn are then placed in the grain container and heat is applied to the bottom of the oil container until the temperature of the oil is found to be sufficient to cause the rupture of the grain thru the conversion of its water content into steam. The temperature of the oil in the oil container is then suitable for the popping operation following the removal of the experimental grains from the grain container.

A charge of the grain that is to be popped is then introduced into the grain container, the cover is placed on the open mouth of the grain container and the heating is continued. The grains of popping corn are subjected to a substantially uniformly increasing temperature gradient thruout their surfaces and as their outer shells become ruptured the exploded grains move upwardly into the upper portion of the grain container. Oil that is spattered by the popping corn is also prevented from escaping out of the top of the grain container by the cover that is mounted thereon. Each grain, as it explodes, carries with it a sufficient quantity of the oil to properly butter the popped corn. The elevation of the oil level above the drainage grid that forms a part of the grain container increases the quantity of oil that is carried by the popped corn.

Upon the cessation of the popping operation within the grain container, the grain container is drained of oil by its rotation with respect to the oil container until the lower tips of the cam blocks are disposed on the upper land surfaces of the oil container side wall and the members are left in this position for a sufficient time for the substantially complete drainage of oil from the grain container.

The grain container is then removed from its engagement with the oil container and the popped corn is transferred from the grain container into a suitable popped corn container. The grain container is then replaced on the oil container, to which it will be found necessary to add additional oil from time to time, until the desired quantity of popped corn is obtained. The oil is then discarded or is poured from the oil container into a suitable storage container and the utensils are cleaned for storage.

It will be noted that the described device requires no agitation during the popping operation and it will be found on operation that substantially the entire quantity of good quality corn of proper water content with which the grain container is charged, is popped with substantially no burning thereof.

It is to be understood that the particular embodiments of the invention that are disclosed herein and the constructions of the various parts of the cooking utensil that are shown and described herein are presented for purposes of illustration and explanation and that various changes in the constructions of the parts described and illustrated and in the adaptations and the uses to which the device may be put may be made without departing from the invention as defined in the appended claims.

What we claim is:

1. A cooking utensil, comprising in combination an oil container, a grain container having a portion adapted for being removably positioned within said oil container, a drain surface forming a part of said grain container, and grain container supporting cam forming a part of said oil container and engaging a part of said grain container whereby said grain container may be supported at a plurality of levels to drain into said oil container.

2. A cooking utensil, comprising in combination an oil container having a bottom portion, a grain container adapted for being removably positioned on said oil container, a drainage means forming a part of said grain container, and inclined means interposed between said oil container and said grain container for adjustably spacing said drainage means from said oil container bottom portion.

3. A cooking utensil, comprising in combination an oil container having a bottom portion, a cam surface forming a part of said oil container, a grain container adapted for resting on said oil container, drainage means forming a part of said grain container, and oil container cam surface engaging means carried by said grain container whereby said grain container drainage means may be adjustably spaced from said oil container bottom.

4. A cooking utensil, comprising in combination an oil container having a bottom portion and an upwardly extending side wall, a cam surface forming a part of said oil container upwardly extending side wall, a grain container for use in conjunction with said oil container, a drainage means forming a part of said grain container, means for supporting said grain container on said oil container and for engaging said oil container cam surface for spacing said grain container drainage means from said oil container bottom.

5. A cooking utensil, comprising in combination a liquid container, a grain container adapted for removably resting on said liquid container, a drainage means forming a part of said grain container and adapted for draining into said liquid container, and inclined means interposed between said liquid container and said grain container for adjustably spacing said drainage means from a portion of said liquid container.

6. A corn popper device, comprising in combination, an outer container, a bottom portion forming a part of said outer container, an inner container having a portion adapted for being removably inserted into said outer container, a bottom portion of said inner container apertured for the passage of a fluid therethru, and interengaging inclined means disposed between said outer container and said inner container whereby said inner container bottom portion may be adjustably spaced with respect to said outer container bottom portion.

7. A utensil, comprising an outer fluid retaining receptacle having a bottom portion, an outer receptacle handle for grasping said outer receptacle, an inner receptacle, an inner receptacle lower portion adapted for being removably inserted into said outer receptacle, an inner receptacle drain portion for permitting a fluid to pass therethru, an inner receptacle handle for grasping said inner receptacle, and inclined means interposed between said outer receptacle and said inner receptacle for adjustably altering the proximity of said inner receptacle drain portion to said outer receptacle bottom portion.

8. A utensil, comprising an outer container having a closed bottom portion, an inner container having a portion removably positioned within said outer container, an inner container bottom portion perforated for the passage of a fluid therethru, and inclined means disposed between said outer container and said inner container for varying the proximity of said inner container bottom portion with respect to said outer container bottom portion.

9. A utensil, comprising an outer container having a closed bottom portion, an inner container having a portion removably positioned within said outer container, an inner container bottom portion perforated by a plurality of frustro-conical apertures for the passage of fluid therethru, and interengaging inclined means disposed between said outer container and said inner container for varying the proximity of said inner container bottom portion with respect to said outer container bottom portion.

10. A utensil, comprising an outer container having a closed bottom portion, an inner container having a portion removably positioned within said outer container, an inner container screen bottom portion for the passage of a fluid therethru, and inclined means disposed between said outer container and said inner container for varying the proximity of said inner container screen bottom portion with respect to said outer container bottom portion.

11. A utensil, comprising an outer container having a closed bottom portion, an inner container having a portion positioned within said outer container, an inner container bottom portion comprising a screen mounted in a rigid peripheral ring removably disposed within said inner container and adapted for the passage of a fluid therethru, and inclined means disposed between said outer container and said inner container for varying the proximity of said inner container bottom portion with respect to said outer container bottom portion.

12. A utensil, comprising an outer container having a closed bottom portion, an inner container having a portion positioned within said outer container, an inner container bottom portion comprising a plurality of substantially inter-parallel rods adapted for the passage of a fluid therebetween, and inclined means disposed between said outer container and said inner container for varying the proximity of said inner container bottom portion with respect to said outer container bottom portion.

13. A utensil, comprising an outer container having a closed bottom portion and an upstanding side wall portion, a depression formed in said outer container side wall, an inner container having a portion positioned within said outer container and having an upstanding side wall portion, drainage means forming a part of said inner container, a projection forming a part of said inner container side wall and adapted for being removably inserted in said outer container depression for spacing said inner container drainage means from said outer container closed bottom portion.

14. A utensil, comprising in combination, an outer container, an upstanding side wall forming a part of said outer container, a threaded portion forming a part of said outer container upstanding side wall, a closed bottom portion forming a part of said outer container, an inner container having a part adapted for being inserted into said outer container, a drainage means forming a part of said inner container, an upstanding side wall forming a part of said inner container, and an inner container threaded portion for engaging said outer container threaded portion for adjustably positioning said inner container drainage means with respect to said outer container bottom portion.

15. A utensil, comprising in combination, an outside container having a closed bottom portion, an inside container having an upstanding side wall, an inside container bottom portion having a plurality of frustro-conically downwardly converging side walled portions terminating downwardly in apertures, an inside container supporting inclined means forming a part of said outside container, and inside container supporting inclined means engaging means forming a part of said inside container.

16. A utensil, comprising in combination, an outside container having a closed bottom portion, an inside container, a screen forming the bottom portion of said inside container and rigidly secured thereto and spaced from said outside container closed bottom portion, and an inclined means interposed between said outside container and said inside container for adjustably spacing said inside container screen bottom portion from said outside container closed bottom portion.

17. A utensil, comprising in combination, an outside container having a closed bottom portion, an inside container having an upstanding side wall, a screen positioned within a ring disposed along the periphery of said screen and rigidly secured thereto and said ring being insertable in said inside container for forming a bottom portion thereof, an inturned flange forming a part of said inside container side wall and adapted for supporting said removable screen carrying ring, and an inclined means interposed between said outside container and said inside container for adjustably spacing said inside container screen bottom portion from said outside container closed bottom portion.

18. A utensil, comprising in combination, an outside container having a closed bottom portion, an inside container having an upstanding side wall and a lower flange, a plurality of rods disposed in spaced relation with each other and resting on said inside container lower flange to form an inside container bottom portion and serving as fluid conducting drain means when said inside container is tilted to elevate one end of said rods to a level above the level of the opposite end of said rods, and an inclined means interposed between said outside container and said inside container for adjustably spacing said inside container bottom portion from said outside container closed bottom portion.

19. A cooking utensil, comprising in combination a liquid container, a grain container, and means adjustable by rotation of said grain container relative to said liquid container for supporting said grain at a plurality of adjustable cooking levels relative to said liquid container.

20. A utensil, comprising in combination an oil container, a grain container having a portion that may be removably inserted into said oil container, a grain container bottom portion that is adapted for the substantially free circulation of oil therethru, and inclined grain container adjusting means interposed between said oil container and said grain container.

21. A utensil, comprising in combination an oil container having an upstanding side wall portion, a grain container having a side wall portion that is removably insertable within said oil container and spaced from said oil container side wall portion sufficiently to prevent capillary oil action therebetween, and inclined grain container adjusting means interposed between said oil container and said grain container.

ALEXANDER M. LENDRUM.
JOHN N. OREBAUGH.